United States Patent [19]

Lepage et al.

[11] Patent Number: 4,836,997
[45] Date of Patent: Jun. 6, 1989

[54] PLASMA PRODUCTION OF TRICHOROSILANE, SIHCL₃

[75] Inventors: Jean-Luc Lepage, Lyon; Gerard Simon, Villeurbanne, both of France

[73] Assignee: Rhone-Poulenc Specialites Chimiques, Courbevoie, France

[21] Appl. No.: 516,843

[22] Filed: Jul. 25, 1983

[30] Foreign Application Priority Data

Jul. 26, 1982 [FR] France ................................ 82 12971

[51] Int. Cl.⁴ ............................................. C01B 17/00
[52] U.S. Cl. ..................................... 423/342; 423/341; 423/347; 423/DIG. 10; 204/164
[58] Field of Search ....... 423/341, 342, 347, DIG. 10; 204/164

[56] References Cited

U.S. PATENT DOCUMENTS

| | | | |
|---|---|---|---|
| 3,069,239 | 12/1962 | Winter et al. | 423/342 |
| 3,899,573 | 8/1975 | Shaw et al. | 204/164 |
| 4,309,259 | 1/1982 | Sarma et al. | 204/164 |
| 4,321,246 | 3/1982 | Sarma et al. | 204/164 |
| 4,451,436 | 5/1984 | O'Hare | 423/402 |

FOREIGN PATENT DOCUMENTS

| | | | |
|---|---|---|---|
| 57-156318 | 9/1982 | Japan | 423/341 |
| 883326 | 11/1961 | United Kingdom | 423/342 |
| 924545 | 4/1963 | United Kingdom | 423/342 |

*Primary Examiner*—William R. Dixon, Jr.
*Assistant Examiner*—Anthony J. Green
*Attorney, Agent, or Firm*—Burns, Doane, Swecker & Mathis

[57] ABSTRACT

Trichlorosilane, $SiHCl_3$, is facilely prepared by (i) thermally reducing silicon tetrachloride, $SiCl_4$, with hydrogen to produce reaction admixture comprising $SiHCl_3$ and hydrochloric acid, said thermal reduction being carried out in a thermal plasma while tempering the reaction medium with a cooling gas, (ii) reacting said step (i) reaction admixture with elemental silicon at a temperature of from about 250° to 350° C. to produce $SiHCl_3$ and hydrogen therefrom, and thence (iii) separating (iiia) the plasma-creating, hydrogen and cooling gases, and (iiib) product silicon chlorides therefrom.

10 Claims, 1 Drawing Sheet

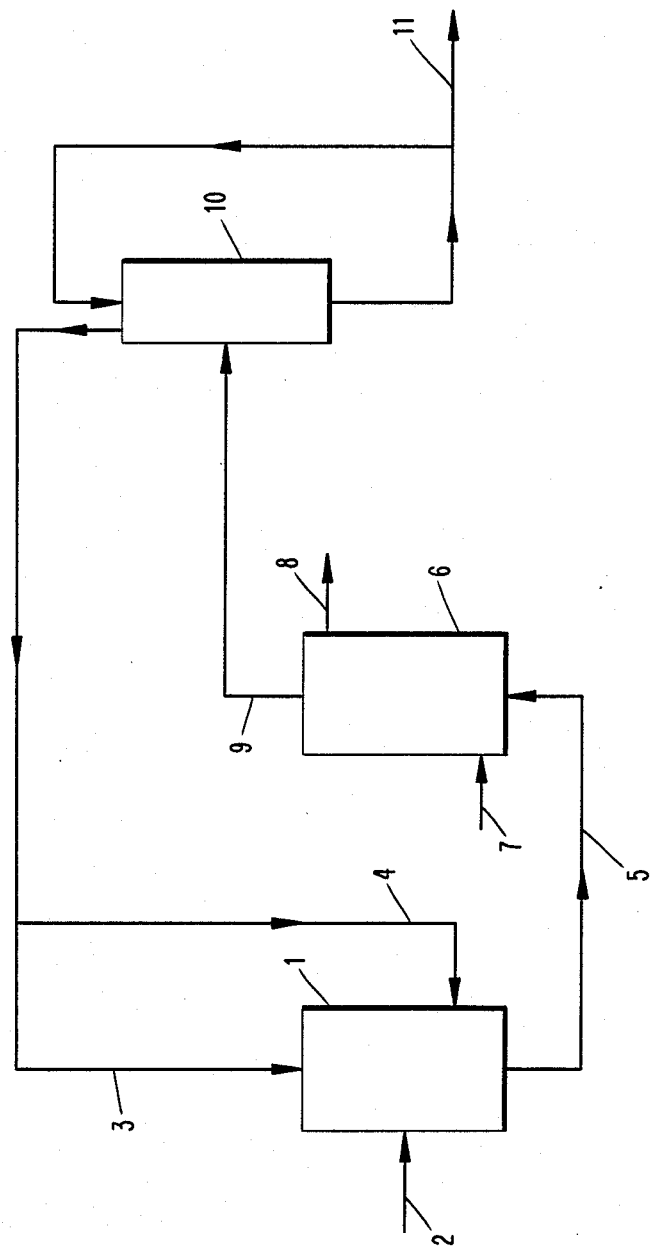

PLASMA PRODUCTION OF TRICHOROSILANE, SIHCL₃

BACKGROUND OF THE INVENTION

1. Field of the Invention

The present invention relates to the preparation of trichlorosilane-based admixture well adapted for the production of semiconductor grade elemental silicon therefrom.

2. Description of the Prior Art

It is known to this art to prepare high grade silicon by decomposing chlorosilanes, preferably trichlorosilane.

Trichlorosilane, upon decomposition thereof, leads to the formation of significant amounts of silicon tetrachloride, such decomposition of trichlorosilane taking place according to the reaction:

$$4HSiCl_3 \rightarrow 3 Si + 3SiCl_4 + 2H_2$$

Furthermore, the synthesis of silane, $SiH_4$, by dismutation of trichlorosilane also gives rise to the formation of silicon tetrachloride which must then be converted back into the starting material trichlorosilane.

It too is known to convert such silicon tetrachloride into trichlorosilane by thermal reduction thereof, with hydrogen, according to the reaction:

$$SiCl_4 + H_2 \rightleftharpoons SiCl_3 + HCl$$

Since this reaction is balanced, the production of trichlorosilane is facilitated by increasing the temperature and tempering the reaction medium, e.g., by sudden cooling, in order to militate against the reverse reaction. Hence, it too has been proposed, for example in British Patent No. 924,545, to conduct the thermal reduction of silicon tetrachloride with hydrogen in a plasma and by projecting the reaction mixture against an appropriately chilled metal surface to thereby attain a proper tempering of said reaction mixture.

SUMMARY OF THE INVENTION

Accordingly, a major object of the present invention is the provision of improved means for the thermal reduction of silicon tetrachloride in a plasma medium, said improved means featuring tempering the reaction mixture by injecting therein a stream of a cooling gas.

BRIEF DESCRIPTION OF THE DRAWINGS

The FIGURE of Drawing is a diagrammatic/schematic illustration of apparatus suited to carry out the process according to the invention.

DETAILED DESCRIPTION OF THE INVENTION

More particularly according to this invention, it is reiterated that one product of the thermal reduction of silicon tetrachloride is hydrochloric acid. And in one embodiment of the present invention, it too has been found that, in spite of the low concentration of hydrochloric acid, the reaction mixture could itself be advantageously employed as a reactant with elemental silicon particulates to prepare additional amounts of trichlorosilane Such secondary reaction proceeds according to the equation:

$$3HCl + Si \rightarrow SiHCl_3 + H_2$$

This reaction must take place at a temperature ranging from 250° to 350° C. and preferably in the presence of a catalyst comprised of copper or of a copper-based alloy. It has now been determined that, by employing such reaction, not only are additional amounts of trichlorosilane produced, but also hydrogen gas, which can be recycled. Also, reaction is ensured of the total amount of the hydrochloric acid contained in the reaction gas feedstream, such that it is no longer required to purify same, in terms of decomposing the trichlorosilane which it contains. Finally, the amount of heat required to trigger the reaction of the hydrochloric acid with the elemental silicon will advantageously be provided by the initial thermal reduction of the silicon tetrachloride in a plasma environment.

This invention therefore features a process for the preparation of trichlorosilane from silicon tetrachloride, comprising:

(i) in a first step, thermally reducing silicon tetrachloride with hydrogen to produce trichlorosilane, said reaction being conducted in a thermal plasma and with a tempering cooling of the reaction environment;

(ii) next reacting, at 250° to 350° C., and preferably in the presence of a copper catalyst, the reaction medium emanating from the step (i) with elemental silicon as to consume the hydrochloric acid contained in such reaction medium and to thereby produce trichlorosilane and hydrogen; and (iii) thence separating, on the one hand, the permanent or plasmagenic gases, hydrogen and ultimately the tempering gas (which is recycled) and, on the other hand, silicon by-products which are ultimately purified prior to suggested decomposition under the typical conditions for decomposition of trichlorosilane.

The invention will now be further illustrated with reference to the accompanying single FIGURE of Drawing, wherein:

In the plasma reactor 1, the silicon tetrachloride is thermally reduced with hydrogen, said reactor 1 being supplied, via the feed conduit 2, with silicon tetrachloride, via the feed conduit 3, with plasmagenic gas, including hydrogen, either undiluted or comprising an inert gas (argon), and via the feed conduit 4, with the inert gas used to temper the plasma reaction medium; in such case, the composition of the reaction medium is the same as that of the plasmagenic gas.

In another embodiment of the invention, a non-plasmagenic gas like $SiCl_4$, which is vaporized, is used as the tempering medium, or a third inert gas comprising said medium is utilized therefor.

From the reactor 1, a gaseous reaction admixture outlets via the line 5, said admixture comprising, other than the plasmagenic gas and probably the tempering gas (or materials which decompose such gas), hydrochloric acid, trichlorosilane and unreacted silicon tetrachloride.

Such outlet gas is transferred into the reactor 6, with the silicon powder also being charged therein, via the feed conduit 7, with the temperature within said reactor 6 being maintained at from 250° to 350° C., with catalytic amounts of copper powder also being added thereto. Impurities are vented from the reactor 6 via line 8 and a gaseous admixture essentially comprising the plasmagenic gas (the hydrogen content of which having been reconstituted), and additional amounts of trichlorosilane and of tetrachlorosilane, outlets via the line 9.

Such outlet gas is charged into the column 10, wherein are separated by washing, on the one hand, the permanent gases (plasmagenic gas) which can be recycled, and, on the other hand, the silicon products which are drawn off through the line 11. The latter are ultimately purified if they contain traces of HCl, whereupon decomposition of trichlorosilane is then carried out under ordinary conditions.

In order to further illustrate the present invention and the advantages thereof, the following specific examples are given, it being understood that same are intended only as illustrative and in nowise limitative; in said examples to follow are illustrated the thermal reduction of silicon tetrachloride with hydrogen, and reaction of the resulting gaseous admixture with the elemental silicon powder.

EXAMPLE 1

Reduction of silicon tetrachloride in a plasma arc

The plasma jet was produced by a blown arc generator at a potential of 12.5 KW. The cathode was comprised of a conical bar of tungsten thorite having a diameter of 10 mm. The anode was comprised of copper and was shaped in the form of a tube having a diameter of 4 mm and a length of 38 mm, which widened in the direction of the cathode.

The plasma-producing gas was a hydrogen/argon mixture in a volumetric ratio of 3/7. Its feed rate was 40 l/mn. The voltage was 62.5V, with an intensity at 200 A.

The reactive silicon tetrachloride, which was previously vaporized, was injected directly into the tube outlet. Its feed rate was 4.3 l/h (in liquid form).

The tempering gas was gaseous silicon tetrachloride. Its temperature was 120° to 125° C. Same was injected 40 mm from the point of introduction of the reactive silicon tetrachloride, at a feed rate of 8.6 l/h (in liquid form).

A probe which was situated along the axis of the plasma generator enabled sampling for chromatographic analysis of the product gaseous admixture. Cooling was restricted to 50° C. in order to avoid condensation of the silicon tetrachloride.

The composition of the reaction effluent at the reactor outlet was as follows:

| (1) $H_2$ | 5.2% |
| (2) Ar | 33.0% |
| (3) $HSiCl_3$ | 8.9% |
| (4) $SiCl_4$ | 44.0% |
| (5) HCl | 8.9% |

The ratio of transformation of the reaction silicon tetrachloride into trichlorosilane was 50.4% and the energy consumption, computed by taking into account the feedstreams and the plasma torch potential, was 4.9 KWh per kg of product trichlorosilane.

EXAMPLE 2

Reduction of silicon tetrachloride in a plasma arc

Plasma-producing gas, the composition and rate of feed thereof being identical to those of Example 1, was fed within the same plasma generator (intensity and voltage were identical) as in said Example 1.

The reactant silicon tetrachloride was injected at a feed rate of 4.3 l/hr (in liquid form).

The tempering gas was comprised of methane; its rate of feed was 30 l/mn.

The composition of the reaction effluent at the reactor outlet was as follows:

| (1) $H_2$ | 4.4% |
| (2) Ar | 32.9% |
| (3) $CH_4$ | 33.6% |
| (4) $HSiCl_3$ | 9.7% |
| (5) $SiCl_4$ | 6.3% |
| (6) HCl | 11.4% |

The make-up to 100% comprised various silanes. In light of the rates of flow of the various gaseous streams, the aforesaid composition evidenced a ratio of transformation of the silicon tetrachloride of 64.5%. The trichlorosilane yield relative to converted $SiCl_4$ was 85.4%. The energy consumption was about 4.5 KWh per kg of product trichlorosilane.

EXAMPLE 3

Reaction of gaseous product of $SiCl_4$ reduction with elemental silicon powder

A solid charge was used, which comprised admixture of 20 g of elemental silicon powder (average diameter, 100 microns) and 2.26 g of powdered metallic copper.

The mixture was charged into a reactor (static bed) and heated to 300° C. A gaseous reactant was charged within said admixture, the molar composition of which was as follows:

| (1) $H_2$ | 89.1% |
| (2) HCl | 4.6% |
| (3) $SiHCl_3$ | 4.6% |
| (4) $SiCl_4$ | 1.7% |

The rate of gas flow was 2.25 l/hr. 100% of the hydrochloric acid was converted into a yield of 88.3% of trichlorosilane and 11.7% of silicon tetrachloride.

EXAMPLE 4

Reaction of gaseous product of $SiCl_4$ reduction with elemental silicon powder

The procedure of Example 3 was repeated, at a temperature of 260° C., employing a gaseous reactant having the molar composition as follows:

| (1) Argon | 87.0% |
| (2) HCl | 5.5% |
| (3) $SiHCl_3$ | 5.5% |
| (4) $SiCl_4$ | 2.0% |

100% of the hydrochloric acid thus introduced produced 95.5% of $SiHCl_3$ and 4.5% of $SiCl_4$.

EXAMPLE 5

This example illustrated the seriatim procedure of thermal reduction of silicon tetrachloride in a plasma arc, followed by preparation of trichlorosilane by reaction of the hydrochloric acid formed in said plasma arc stage with elemental silicon.

First stage (silicon tetrachloride reduction in a plasma arc):

The plasma generator was identical to that of Example 1.

The plasma-producing gas was an argon/hydrogen mixture in a volumetric ratio of 35/65. Its feed rate was 40/mn. The voltage was 70V, with an intensity at 200 A.

The silicon tetrachloride was injected, in vaporized form, at a rate of feed of 4.2 l/hr (liquid flow), or 0.607 moles/mn.

The tempering gas was argon injected 45 mm from the point of introduction of the silicon tetrachloride, at a feed rate of 25 l/mn.

The molar composition of the reaction effluent at the reactor outlet was as follows:

| | | |
|---|---|---|
| (1) $H_2$ | 10.1% |
| (2) Ar | 66.7% |
| (3) $SiHCl_3$ | 16.4% |
| (4) $SiCl_4$ | 6.8% |

This composition reflects a conversion of hydrochloric acid of 100% with a selectivity of 97.1% of trichlorosilane and 2.9% of silicon tetrachloride.

Accordingly, the total degree of conversion of the silicon tetrachloride consistent with the following equation was 64.5% and the trichlorosilane yield was 99.9%.

$$2H_2 + 3SiCl_4 + Si \rightarrow 4SiHCl_3$$

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of trichlorosilane, $SiHCl_3$, which comprises (i) thermally reducing silicon tetrachloride, $SiCl_4$, with hydrogen to produce a reaction admixture comprising $SiHCl_3$ and hydrochloric acid, said thermal reduction being carried out in a thermal plasma while tempering the reaction medium with a cooling gas, (ii) reacting said step (i) reaction admixture with elemental silicon at a temperature of from about 250° to 350° C. to produce $SiHCl_3$ and hydrogen therefrom, and thence (iii) separating (iiia) the plasma-creating, hydrogen and cooling gases, and (iiib) product silicon chlorides therefrom.

2. The process as defined by claim 1, said step (ii) being carried out in the presence of catalytically effective amounts of copper.

3. The process as defined by claim 2, further comprising recycling of said gases (iiia).

4. The process as defined by claim 2, said cooling gas comprising the plasma-creating gas.

5. The process as defined by claim 2, said cooling gas comprising silicon tetrachloride vapors.

6. The process as defined by claim 2, said cooling gas comprising an inert gas.

7. The process as defined by claim 1, further comprising reducing product $SiHCl_3$ to elemental silicon.

8. The process as defined by claim 1, the hydrochloric acid produced in the step (i) being essentially completely converted in said step (ii).

9. The process as defined by claim 7, said product (iiib) being purified prior to reduction of the $SiHCl_3$ to elemental silicon.

10. A process for the preparation of trichlorosilane, $SiHCl_3$, which comprises (i) thermally reducing silicon tetrachloride, $SiCl_4$, with hydrogen to produce a reaction admixture comprising $SiHCl_3$ and hydrochloric acid, said thermal reduction being carried out in a thermal plasma while tempering the reaction medium by injecting with a cooling gas directly into said medium, (ii) reacting said step (i) reaction admixture with elemental silicon at a temperature of from about 250° to 350° C. to produce $SiHCl_3$ and hydrogen therefrom, and thence (iii) separating (iiia) the plasma-creating, hydrogen and cooling gases, and (iiib) product silicon chlorides therefrom.

* * * * *